Oct. 22, 1929.　　　　R. MARSLAND　　　　1,732,761

PACKING

Filed March 28, 1924

WITNESSES:

R. Marsland
INVENTOR

BY
ATTORNEY

Patented Oct. 22, 1929

1,732,761

UNITED STATES PATENT OFFICE

ROLAND MARSLAND, OF ESSINGTON, PENNSYLVANIA, ASSIGNOR TO WESTINGHOUSE ELECTRIC & MANUFACTURING COMPANY, A CORPORATION OF PENNSYLVANIA

PACKING

Application filed March 28, 1924. Serial No. 702,491.

My invention relates to shaft packing devices, more particularly to devices for sealing the shafts of fluid motors, such as, for example, steam turbines, and it has for an object to provide apparatus of the character designated which shall perform efficiently and effectively and in which the operation shall not entail the loss of any of the sealing fluid. It has for a further object to provide a packing device which shall conserve substantially all of the heat energy which is incidentally generated in its operation.

Figure 1:
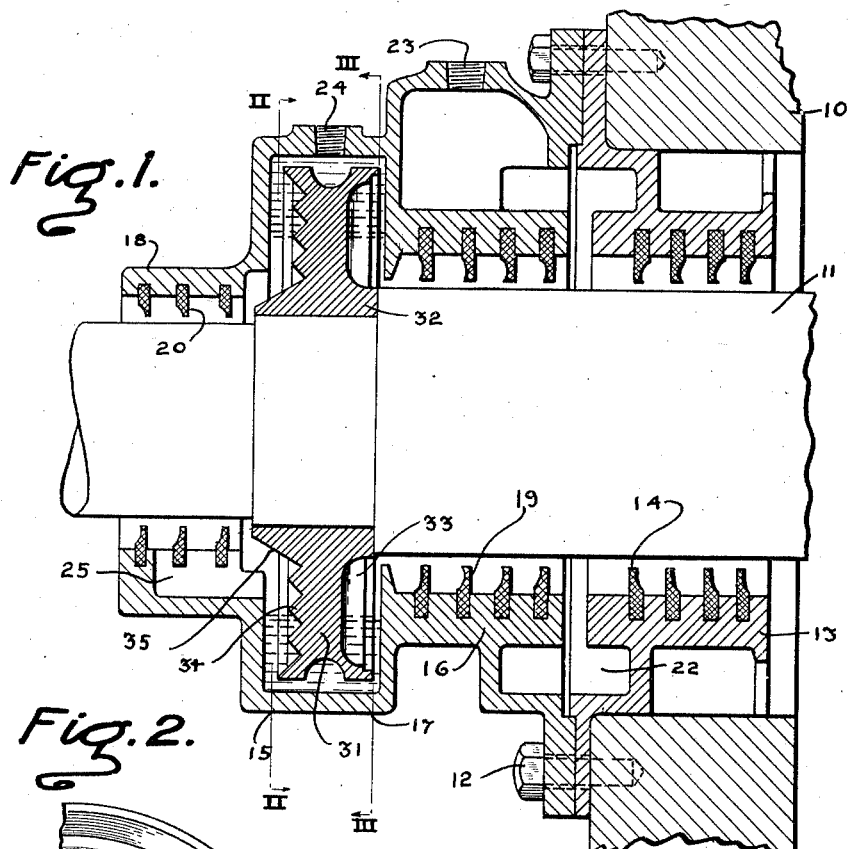
Figure 2:
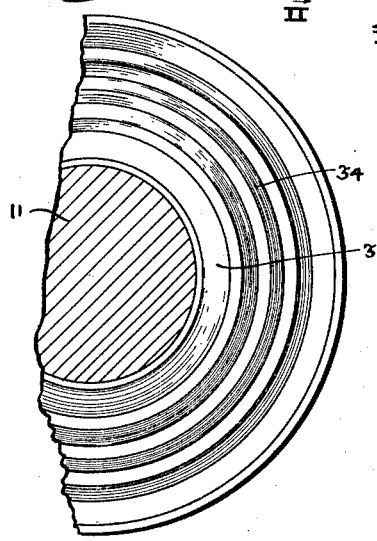
Figure 3:
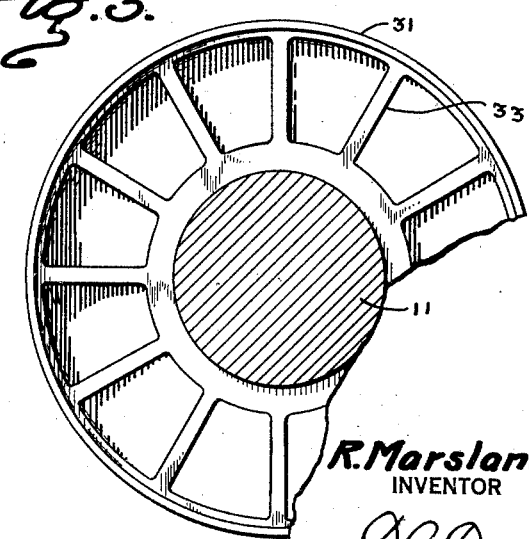

These and other objects of my invention, which will be manifest in the further description thereof, are set forth in the following specification and illustrated in the accompanying drawings in which Fig. 1 is a longitudinal, sectional elevation of one form of my improved packing device; Fig. 2 is a transverse, sectional elevation taken on the line II—II of Fig. 1 and illustrates one of the radial faces of the packing runner, and Fig. 3 is a transverse, sectional elevation taken on the line III—III of Fig. 1 and illustrates the opposite radial face of the packing runner.

Centrifugal liquid sealing devices or packings are generally recognized as providing a very effective means for preventing leakage of fluid between the rotor and the casing of steam turbines. Apparatus of this character generally includes a runner which is attached to the turbine rotor and adapted to operate in a closed annular chamber communicating with the turbine casing. In operation, the centrifugal action of the rotating runner maintains a relatively small quantity of water, which is present in the annular chamber, against the outer walls at a pressure sufficient to prevent leakage of air into the turbine, as under high vacuum conditions, or steam from leaking out of the turbine, as under atmospheric or back pressure exhaust conditions.

Sufficient sealing liquid to compensate for leakage and evaporation losses, must be continually supplied to glands of the above character. These leakage losses may occasionally approximate 40 lbs. of water per hour, and while this loss may only slightly effect the operating costs of land turbines, it is of considerable importance in the operation of marine turbines because of the rather limited supply of fresh water which is usually available. Furthermore, because of the relatively higher operating speeds required of marine turbines, the leakage losses become proportionately higher. I have substantially reduced the operating costs of steam turbines by providing a packing device which does not permit of any loss of sealing liquid from the turbine system.

Briefly speaking, my invention consists in providing the radial face of the packing runner, which is remotely disposed from the turbine casing, with a plurality of concentric serrations and a conically-shaped hub portion. In this manner, the frictional resistance encountered by the sealing liquid in attempting to escape radially inward from the periphery to the hub of the runner is very materially increased. In addition thereto, should any portion of the liquid arrive at the hub portion of the runner and attempt to escape outwardly in an axial direction, this portion of the hub being conically shaped, the liquid is required to travel somewhat inwardly and to overcome the opposing action of centrifugal force.

As is customary, my packing device is provided with a series of labyrinth packing elements disposed adjacent to the runner and should a small quantity of the sealing liquid eventually find its way into the latter portion of the packing device, I provide means for returning this liquid to the housing of the runner.

The above enumerated novel features cooperate to produce a packing device which is capable of effectively sealing the rotating shafts of steam turbines and which at the same time does not permit of any loss of sealing liquid. While I have described my invention as being especially adapted for use in marine installations, it will be appreciated that its use is not confined solely thereto, but that it may also be advantageously employed in numerous land installations.

Referring to the drawings for a more detailed description of my invention, I show in Fig. 1 a turbine casing 10 provided with a rotor 11. Inserted within the casing 10 and suitably secured thereto, as by bolts 12, is a packing cylinder 13 having a series of labyrinth packing elements 14 of any well-known type. Disposed adjacent to the packing cylinder 13 and also secured to the turbine casing 10 by the bolts 12 is a casting 15 comprising an inner packing cylinder 16, a housing 17 and an outer packing cylinder 18. The inner and outer packing cylinders 16 and 18 are provided respectively with a series of labyrinth packing elements 19 and 20, of any well-known type. The packing cylinder 13 and the inner packing cylinder 16 cooperate to provide an annular passage 22 having a vapor outlet connection 23. Provided in the housing 17 is a liquid inlet connection 24 for the admission of sealing fluid and provided in the lower portion of the outer packing cylinder 18 is a trough 25 for draining the annular spaces intervening between the labyrinth packing elements 20 and for conveying said drainage to the housing 17.

Disposed in the housing 17 and rigidly secured to the turbine rotor 11 in any suitable manner is a runner 31 having a hub portion 32. As shown in Fig. 3, the radial face of the runner which is disposed adjacent to the turbine is provided with a plurality of vanes 33 for impelling the sealing fluid, while the oppositely-disposed radial face is provided with a plurality of concentric serrations 34, as shown in Fig. 2. On this side of the runner, the hub portion 32 is of conical shape, as illustrated at 35.

The operation of the above embodiment of my invention is as follows: Assuming the turbine to be exhausting against a subatmospheric pressure, there is a natural tendency for the surrounding air to attempt to find its way into the turbine casing, thereby increasing the exhaust pressure and impairing the performance of the turbine. Sealing fluid, such as water, is therefore supplied through the liquid inlet connection 24 to the housing 17 wherein the impelling vanes 33 of the rotating runner 31 serve to maintain a sealing annulus about the inner periphery of the housing. The diameter of the runner 33 is so proportioned as to maintain a sealing annulus of sufficient pressure to prevent any ingress of air into the turbine casing, and a liquid seal is therefore maintained.

The continued rotations of the impelling vanes 33 impart sufficient heat to the sealing liquid to cause some vaporization thereof. The amount of vapor thus generated is somewhat restricted by the labyrinth packings 19 which impede its escape and reduce the pressure. The vapor which is finally liberated, however, enters the annular passage 22 wherein it co-mingles with the vapor which has escaped from the turbine casing 10 through the labyrinth packing elements 14. The vapor accumulating within the annular passage 22 may be discharged through the vapor outlet connection 23 to any region of sufficiently low pressure, as for example, a condenser or the suitable stage of an associated lower pressure turbine. In this manner, the sealing fluid together with the heat energy which it has absorbed is retained in the power plant system.

As indicated upon the drawings, the static pressures of the sealing liquid which is maintained upon the opposite sides of the runner 31 are substantially equal, the centrifugal force exerted by the impelling vanes 33 being counteracted by the combined pressure of the atmosphere and the frictional resistance exerted by the numerous serrations 34. Any substantial loss of sealing fluid is thus prevented. There is, however, a constant amount of mist or spray created by the agitations of the runner, and this mist moves axially outward through the restricted clearances which are necessarily provided between the rotor 11 and the labyrinth packing elements 20. A quantity of this mist is deposited upon the conical hub portion 25 which, in my apparatus, is so shaped that leakage in an axial direction is opposed transversely by centrifugal force. The number of labyrinth packing elements 20, usually two or three, are sufficient to collect the fine liquid particles and convey them to the trough 25 which in turn returns the collected liquid to the housing 17.

I have found from experience that glands constructed as above described operate effectively and reliably without incurring any loss of sealing fluid whatsoever. Only sufficient liquid must be supplied to the inlet connection 24 as is necessary to compensate for the vapor generated, the design of the packing device being such that this vapor is retained in the power plant system. While I have described the runner 32 as being provided with a plurality of concentric serrations, it is to be understood that my invention is not solely confined to such construction, and that I may provide any form of indention capable of producing the desired results.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a device for packing the shaft of a fluid motor, a runner having a radial face disposed adjacent to the motor and provided with a plurality of impelling vanes, and a second radial face remotely disposed from the motor and provided with a plurality of axially extending concentric circular indentions, said runner having impelling vanes on the first mentioned radial face only.

2. In a device for packing the shaft of a fluid motor, a runner having one and only one radial face provided with a plurality of impelling vanes and a second radial face provided with a series of circular serrations.

3. In a device for packing the shaft of a fluid motor, a runner having one radial face provided with a plurality of impelling vanes and a second radial face provided with a plurality of individually continuous circular serrations, said runner having impelling vanes on but one radial face.

4. In a packing device for sealing a shaft against a pressure difference on opposite sides of the packing device, a runner having a plurality of impelling vanes on the radial face on the side of lesser pressure, and having a plurality of individually continuous circular serrations on the radial face on the side of greater pressure, only one radial face of said runner being provided with impelling vanes.

In testimony whereof, I have hereunto subscribed my name this 17th day of March, 1924.

ROLAND MARSLAND.